United States Patent
Saeedi et al.

(10) Patent No.: US 10,193,636 B1
(45) Date of Patent: Jan. 29, 2019

(54) DC-COUPLED OPTICAL BURST-MODE RECEIVER

(71) Applicant: Axalume, Inc., Cayenne Creek Rd., CA (US)

(72) Inventors: Saman Saeedi, San Diego, CA (US); Ashok V. Krishnamoorthy, San Diego, CA (US)

(73) Assignee: Axalume, Inc., San Diego, CA (US)

( * ) Notice: Subject to any disclaimer, the term of this patent is extended or adjusted under 35 U.S.C. 154(b) by 0 days.

(21) Appl. No.: 15/959,199

(22) Filed: Apr. 21, 2018

(51) Int. Cl.
*H04B 10/69* (2013.01)
*H04L 25/06* (2006.01)

(52) U.S. Cl.
CPC ....... *H04B 10/695* (2013.01); *H04B 10/6933* (2013.01); *H04L 25/06* (2013.01)

(58) Field of Classification Search
CPC .... H04B 10/695; H04B 10/6933; H04L 25/06
USPC .......................................................... 398/202
See application file for complete search history.

(56) References Cited

U.S. PATENT DOCUMENTS

| | | | | |
|---|---|---|---|---|
| 5,612,810 A | * | 3/1997 | Inanni | H04B 10/695 250/214 A |
| 5,875,049 A | * | 2/1999 | Asano | H03F 3/08 250/214 A |
| 2003/0011873 A1 | * | 1/2003 | Itoh | G11B 7/123 359/333 |
| 2004/0251403 A1 | * | 12/2004 | Park | H04B 10/6931 250/221 |
| 2012/0033980 A1 | * | 2/2012 | Dong | H04B 10/693 398/202 |

OTHER PUBLICATIONS

A. Rylyakov, et al "A 25 Gb/s Burst-Mode Receiver for Low Latency Photonic Switch Networks," Optical Fiber Communications Conference and Exhibition (OFC), Jun. 15, 2015.

* cited by examiner

*Primary Examiner* — Dalzid E Singh
(74) *Attorney, Agent, or Firm* — Steven Stupp

(57) ABSTRACT

A DC-coupled burst-mode optical receiver is described. The optical receiver may include an input node that receives a current, e.g., from an optoelectronic converter (such as a photodiode). Moreover, the optical receiver may include a current amplifier, coupled to the input node, that provides an output current based at least in part on the current, where the current amplifier has a shunt feedback path that reduces a bias sensitivity of the current amplifier and a feed-forward path that reduces a DC bias current of the current amplifier. Furthermore, the optical receiver may include a TIA, electrically coupled to the current amplifier, that converts the output current to an output voltage. Additionally, the optical receiver may include a feedback loop coupling an output of the TIA to an input of the feed-forward path.

20 Claims, 9 Drawing Sheets

DC-COUPLED OPTICAL BURST-MODE RECEIVER

BACKGROUND

Field

The present disclosure relates to techniques for receiving optical signals. More specifically, the present disclosure relates to a DC-coupled optical burst-mode receiver.

Related Art

Continuous optical receiver front-ends are typically designed to be connected to a transmitter that has stable optical power and a clock domain. Consequently, abrupt variations in the input optical power can result in a loss of lock and/or a long recovery time.

Burst-mode receivers are often used in reconfigurable optical networks and in optical switching applications. In an optical switch or a reconfigurable optical network, incoming optical signals often come from different lasers (or optical sources), and the average power of each of the laser may be different. Consequently, a burst-mode optical receiver usually needs to be able to quickly adjust its DC bias in order to account for the differences in the average power.

In addition, many data centers are transitioning to so-called 'energy-proportional' communication links. These communication links can be turned off in order to save power when there is no data to transmit. However, in order to make energy-proportional communication links practical, components that can rapidly turn on may be needed in order to minimize communication delays across each link. In order to achieve this objective, the time it takes an optical receiver to acquire a DC-bias reference signal and to perform associated clock-recovery operations is often minimized.

As shown in FIG. 1, an existing optical receiver typically distinguishes '0s' and '1s' in an input optical signal that corresponds to a stream of data, and then converts this received optical power into an electrical signal. For example, as shown in FIG. 1, a photodiode is often used to convert the input optical power into an electrical current, which is then converted into a voltage by a current-to-voltage analog front-end stage in the optical receiver.

Because of parasitic effects, such as the photodiode junction capacitance and packaging parasitic capacitance, typically an input node of the analog front-end is the dominant pole, which can limit the data rate of the optical receiver. As shown in FIG. 2, a trans-impedance amplifier (TIA) is often used to reduce the input impedance seen from the input node of the analog-front-end in existing optical receivers, while also reducing the input-referred noise of the subsequent stages.

A principal challenge in using TIAs for burst-mode applications is that the amplifier is often very sensitive to the input DC bias, which typically changes as the input DC current varies. Consequently, as shown in FIG. 3, existing optical receivers usually set the DC bias of the input node using a feedback loop. Moreover, in order to avoid oscillation and instability in the feedback loop, the loop bandwidth often needs to be reduced.

However, existing optical receivers usually require a significant amount of time to initially acquire DC-bias signal levels when they are turned on. Consequently, existing optical receivers are often unsuitable for applications that require rapid turn-on and/or resynchronization. Moreover, existing optical receivers often require additional time to perform associated clock recovery operations to extract a clock signal, which is then used to obtain data from a received optical signal.

SUMMARY

One embodiment of the present disclosure provides an optical receiver. This optical receiver includes an input node that receives a current. Moreover, the optical receiver includes a current amplifier, coupled to the input node, that provides an output current based at least in part on the current, where the current amplifier has a shunt feedback path that reduces a bias sensitivity of the current amplifier and a feed-forward path that reduces a DC bias current of the current amplifier. Furthermore, the optical receiver includes a TIA, electrically coupled to the current amplifier, that converts the output current to an output voltage. Additionally, the optical receiver includes a feedback loop coupling an output of the TIA to an input of the feed-forward path.

Note that the optical receiver may be a burst-mode receiver.

In some embodiments, the optical receiver includes an optoelectronic converter that receive an optical signal representing information and that provides the current corresponding to the information. For example, the optoelectronic converter may include a photodiode.

Moreover, the current amplifier may be DC coupled to the input node. Furthermore, the current amplifier may have an input impedance that is less than a predefined value.

Additionally, a bandwidth of the shunt feedback path may be greater than a predefined value.

Note that a DC output current from the current amplifier corresponding to the DC bias current may be less than a predefined value. For example, the DC output current may be approximately zero.

In some embodiments, the feed-forward path acquires the DC bias current and subtracts the DC bias current from the output current. For example, the feed-forward path may include a switch and the optical receiver may include control logic. When acquiring the DC bias current, the control logic may set the switch in an open state. Moreover, when subtracting the DC bias current from the output current, the control logic may set the switch in a closed state. Furthermore, the feedback loop may compensate for at least one of mismatch and process variation, and the optical receiver may control a gain of the feedback loop to provide stability.

Another embodiment provides a method for converting a current to an output voltage, which may be performed by an optical receiver. During operation, the optical receiver may receive an optical signal representing information and may convert the optical signal to the current corresponding to the information using an optoelectronic converter. Then, the optical receiver may amplify the current to provide an output current using a current amplifier, where the current amplifier may have a shunt feedback path that reduces a bias sensitivity of the current amplifier and a feed-forward path that reduces a DC bias current of the current amplifier. Next, the optical receiver may convert the output current to the output voltage using a TIA, where an output of the TIA is coupled to an input of the feed-forward path by a feedback loop.

In some embodiments, the optical receiver acquires the DC bias current of the current amplifier by opening a switch in a feed-forward path in the current amplifier. Moreover, the optical receiver may close the switch in the feed-forward path and may subtract the DC bias current from the output current provided by the current amplifier.

Another embodiment provides a system that includes the optical receiver.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

A DC-coupled burst-mode optical receiver is described. The optical receiver may include an input node that receives a current, e.g., from an optoelectronic converter (such as a photodiode). Moreover, the optical receiver may include a current amplifier, coupled to the input node, that provides an output current based at least in part on the current, where the current amplifier has a shunt feedback path that reduces a bias sensitivity of the current amplifier and a feed-forward path that reduces a DC bias current of the current amplifier. Furthermore, the optical receiver may include a TIA, electrically coupled to the current amplifier, that converts the output current to an output voltage. Additionally, the optical receiver may include a feedback loop coupling an output of the TIA to an input of the feed-forward path.

By employing shunt feedback, the optical receiver may have reduced bias sensitivity at the input node to DC bias, a reduced input impedance and an increased or extended bandwidth. Moreover, the feed-forward path may provide DC bias current reduction or cancellation, which may reduce the effect of the DC bias current. For example, a feed-forward DC-current acquisition technique may be used to acquire and subtract the DC bias current from the output current. Consequently, the optical receiver may be able to operate with or may be compatible with optical signals having different average power, may have rapid turn on, may have a small communication delay and may facilitate rapid clock recovery and/or resynchronization. Therefore, the optical receiver may enable energy proportional communication links, as well as applications in optical switching and reconfigurable optical networks.

Figure 1:
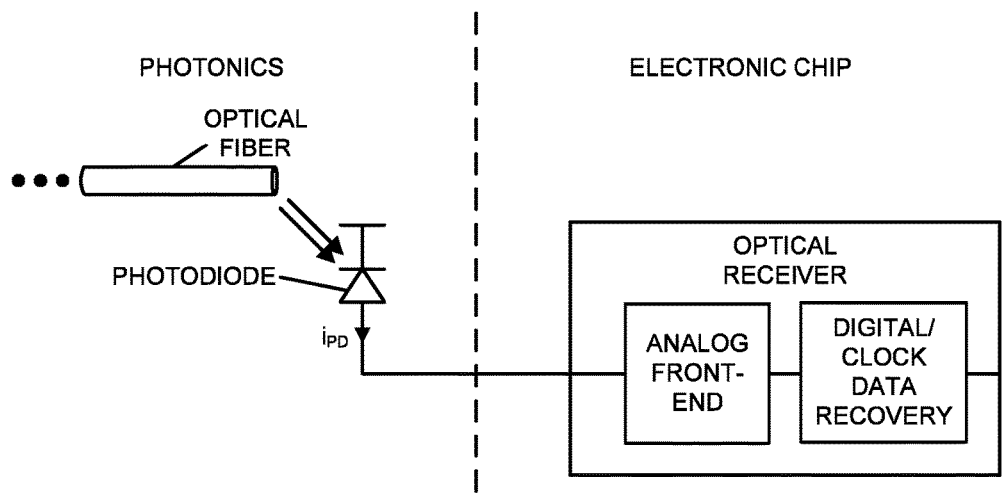
FIG. 1 is a block diagram illustrating an existing optical receiver.
Figure 2:
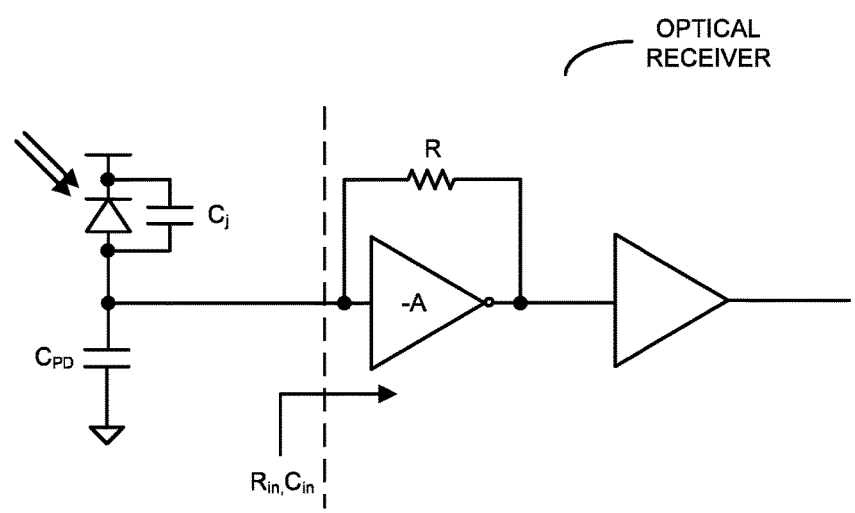
FIG. 2 is a block diagram illustrating an existing optical receiver with an analog front-end that includes a trans-impedance amplifier (TIA).
Figure 3:
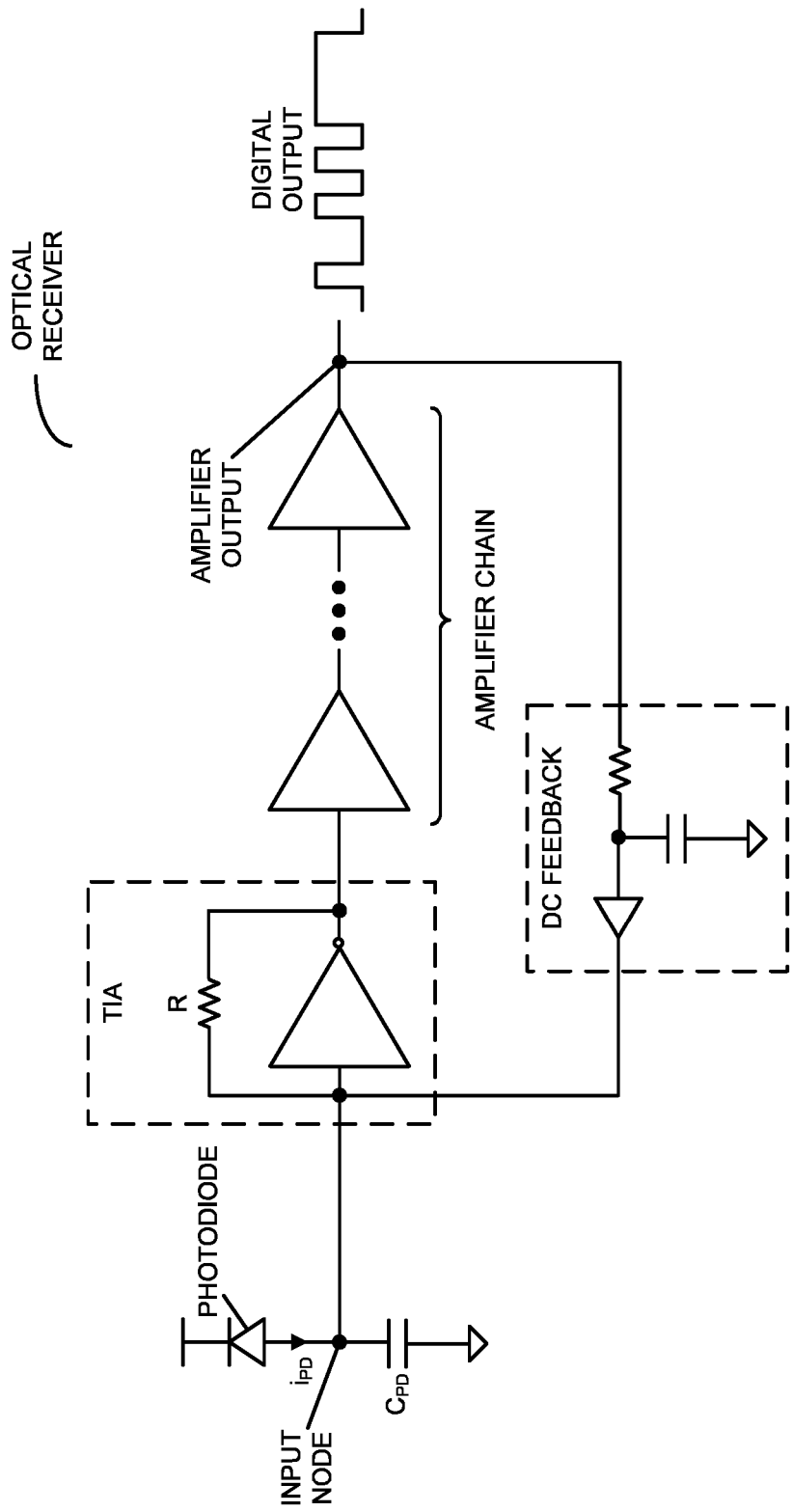
FIG. 3 is a block diagram illustrating an existing optical receiver with an analog front-end that includes a TIA and that uses feedback.
Figure 4:
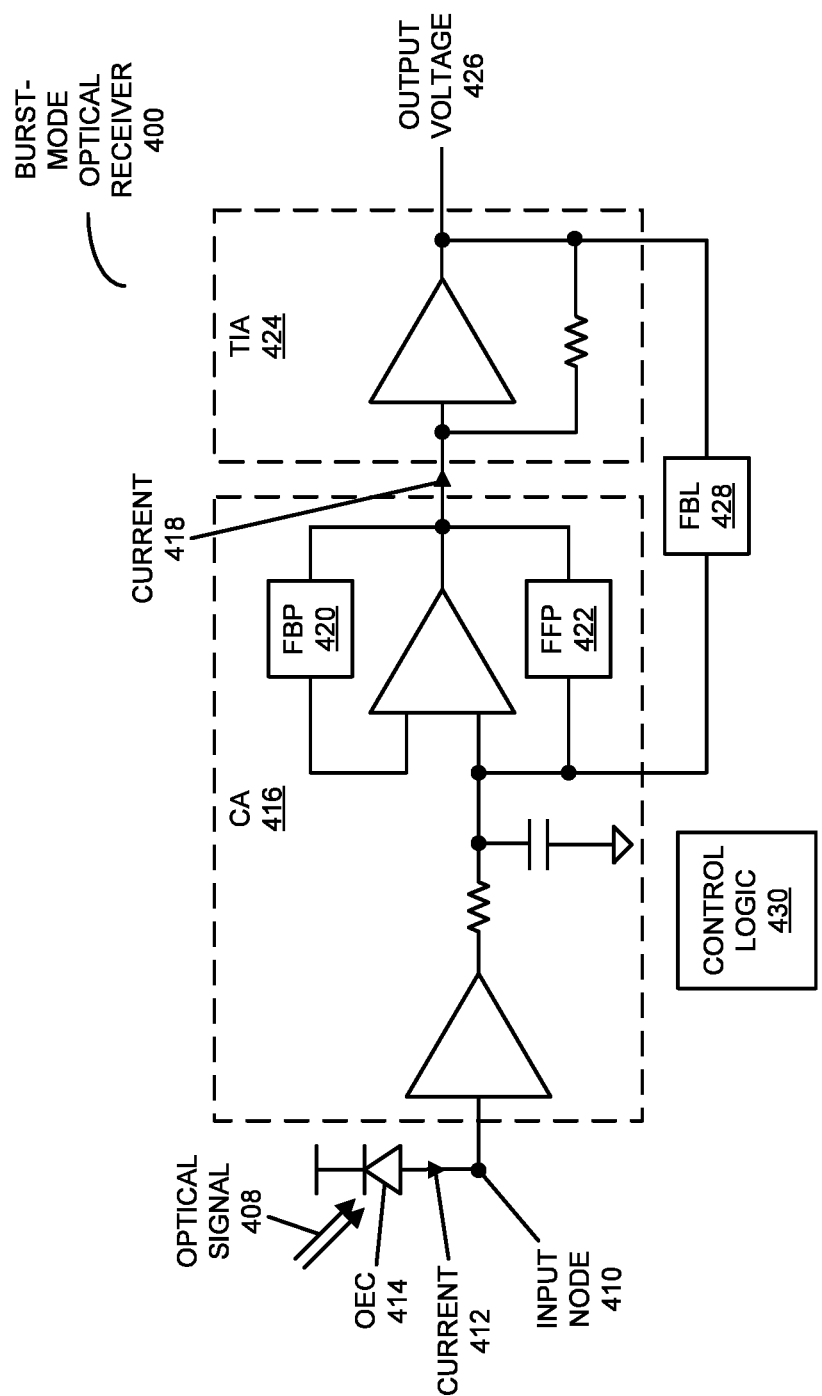
FIG. 4 is a block diagram illustrating an example of a burst-mode optical receiver in accordance with an embodiment of the present disclosure.

We now describe embodiments of the optical receiver, such as a burst-mode optical receiver (as opposed to a continuous-mode optical receiver). FIG. 4 presents a block diagram illustrating an example of a burst-mode optical receiver 400. This optical receiver includes an input node 410 that receives a current 412. For example, during operation of optical receiver 400, current 412 may be received from an optoelectronic converter (OEC) 414, such as a photodiode. In particular, optoelectronic converter 414 may receive an optical signal 408 representing information and may provide current 412 corresponding to the information. Note that optoelectronic converter 414 may be included in or separate from optical receiver 400. Thus, in FIG. 4, optoelectronic converter 414 may be optional.

Moreover, optical receiver 400 may include a current amplifier (CA) 416, coupled to input node 410, that provides an output current 418 based at least in part on current 412, where current amplifier 416 has a shunt feedback path (FBP) 420 that reduces an input impedance of the front-end and is less bias sensitivity compared to a TIA and a feed-forward path (FFP) 422 that reduces a DC bias current of current amplifier 416. Note that current amplifier 416 may be DC coupled to input node 410, and/or may have an input impedance that is less than a predefined value (such as, e.g., 50Ω). Moreover, note that a bandwidth of the shunt feedback path 420 may be greater than a predefined value (such as, e.g., 20 GHz).

Furthermore, optical receiver 400 may include a TIA 424, electrically coupled to current amplifier 416, that converts output current 418 to an output voltage 426. Additionally, optical receiver 400 may include a feedback loop (FBL) 428 coupling an output of TIA 424 to an input of feed-forward path 422.

As described further below with reference to FIGS. 5 and 6, operation of burst-mode optical receiver 400 (such as setting or adjusting operating parameters) may, at least in part, be controlled using control logic 430.

Note that a DC output current from current amplifier 416 corresponding to the DC bias current may be less than a predefined value. For example, the DC output current may be approximately zero.

As discussed previously, the optical receiver may be capable of rapidly turning on and off. In order to achieve this capability, the optical receiver may reduce or minimize the amount of time it takes to acquire a DC bias reference signal and to perform associated clock-recovery operations.

Figure 5:
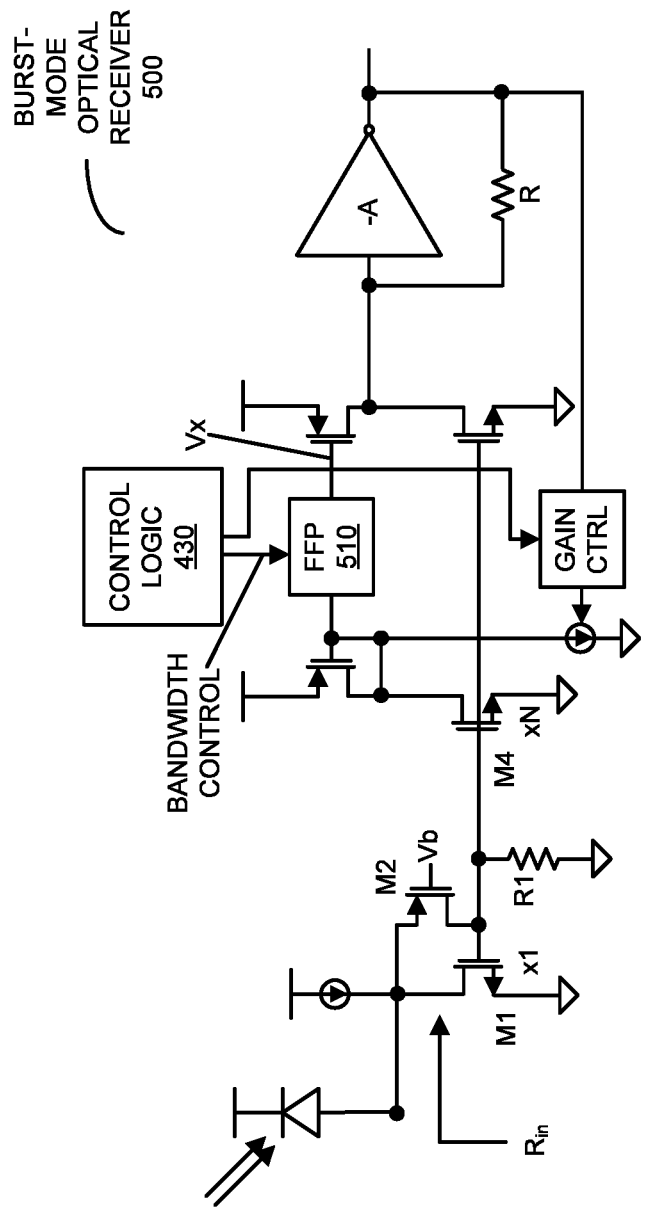
FIG. 5 is a block diagram illustrating an example of a burst-mode optical receiver in accordance with an embodiment of the present disclosure.

FIG. 5 presents a block diagram illustrating an example of a burst-mode optical receiver 500. In this optical receiver, the input impedance of the current amplifier with shunt feedback may be $R_{in}=(r_{ds2} \cdot g_{m1} \cdot g_{m2})^{-1}$. The high transconductance in transistors M1 and M2 may ensure a low input impedance and, thus, a higher bandwidth. Note that the gain of the current amplifier may be independent of the input DC bias. The operation of a feed-forward path 510 with a DC-acquisition block is described further below with reference to FIG. 6.

Burst-mode optical receiver 500 may produce two copies of the amplified current. One copy may carry or include both the DC and AC components, and the other copy may only carry or include the DC component.

While burst-mode optical receiver 500 is illustrated with a single-ended input, in other embodiments a differential input is used.

Figure 6:
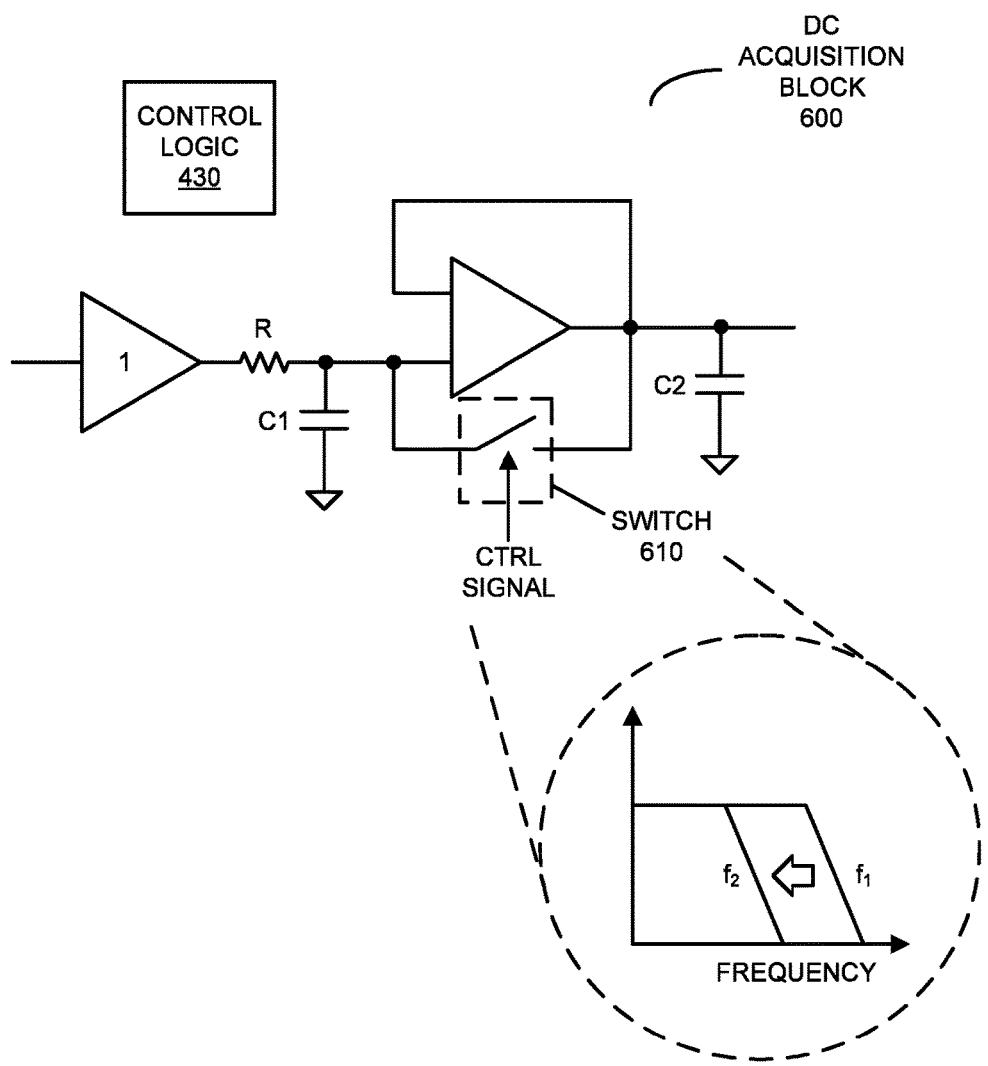
FIG. 6 is a block diagram illustrating an example of a DC-acquisition block in a feed-forward path in a burst-mode optical receiver in accordance with an embodiment of the present disclosure.

FIG. 6 presents a block diagram illustrating an example of a DC-acquisition block 600 in a feed-forward path in a burst-mode optical receiver, such as feed-forward path 422 (FIG. 4) or 510 (FIG. 5). This feed-forward DC-acquisition block may determine or derive the DC component, which may then be subtracted from the output current from the current amplifier. Notably, as illustrated in the Bode plot in the inset, when control logic 430 sets switch 610 in the feed-forward path open or in an open state, the DC-acquisition block may act as a high-speed block with a low acquisition time. Alternatively, when control logic 430 closes switch 610 or sets switch 610 in a closed state, the bandwidth may be reduced to ensure stable DC in the event of a long sequence of 1s or 0s. Switch 610 may also be closed when subtracting the determined DC bias current from the output current.

Furthermore, as shown in FIG. 5, feedback may be introduced from the output of the TIA to drain of transistor M4 to ensure proper compensation for mismatch and process variation. Note that control logic 430 in the optical receiver may adjust or select the gain of this feedback (e.g., an adjustment of up to 3, 6, 10, 30 or 60 dB) in order to ensure stability when the bandwidth of the feed-forward path or loop is high.

Note that a variety of similar topologies can be used to implement the optical technique. For example, currents may be copied using NMOS/PMOS transistors or, as noted previously, an optoelectronic converter may be differentially coupled to the front-end of the optical receiver.

Figure 7:
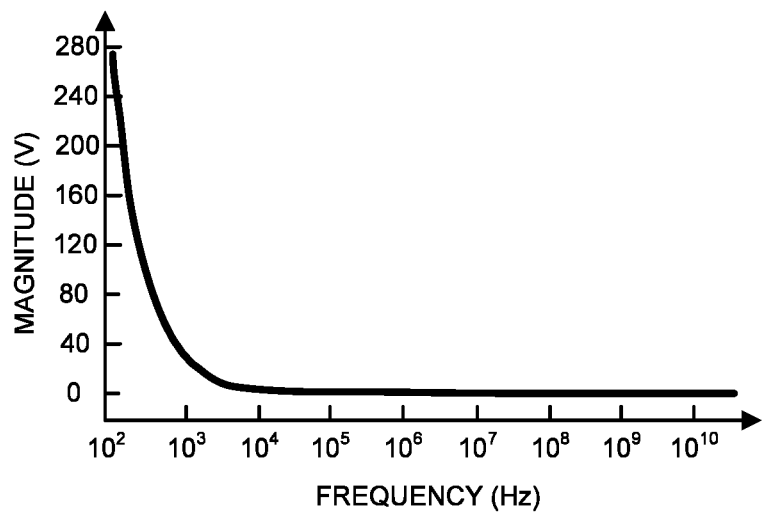
FIG. 7 is a drawing illustrating an example of a simulated sensitivity of a front-end of an optical receiver in accordance with an embodiment of the present disclosure.
Figure 8:
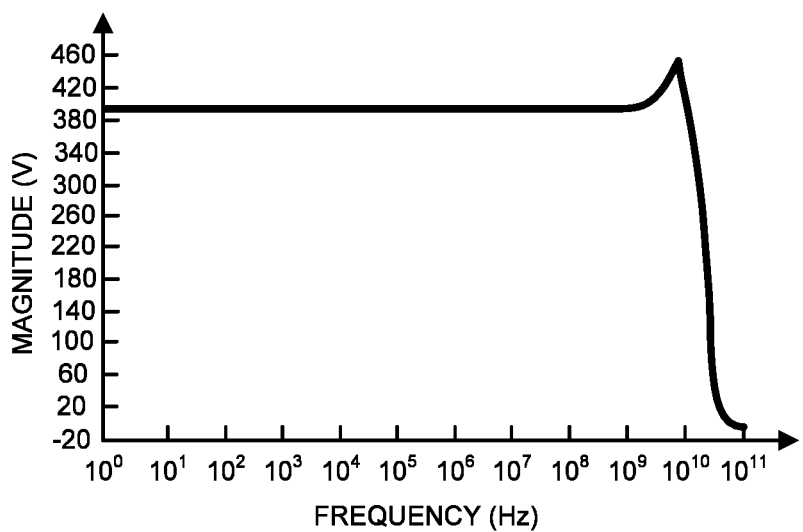
FIG. 8 is a drawing illustrating an example of a simulated bandwidth of a front-end of an optical receiver in accordance with an embodiment of the present disclosure.
Figure 9:
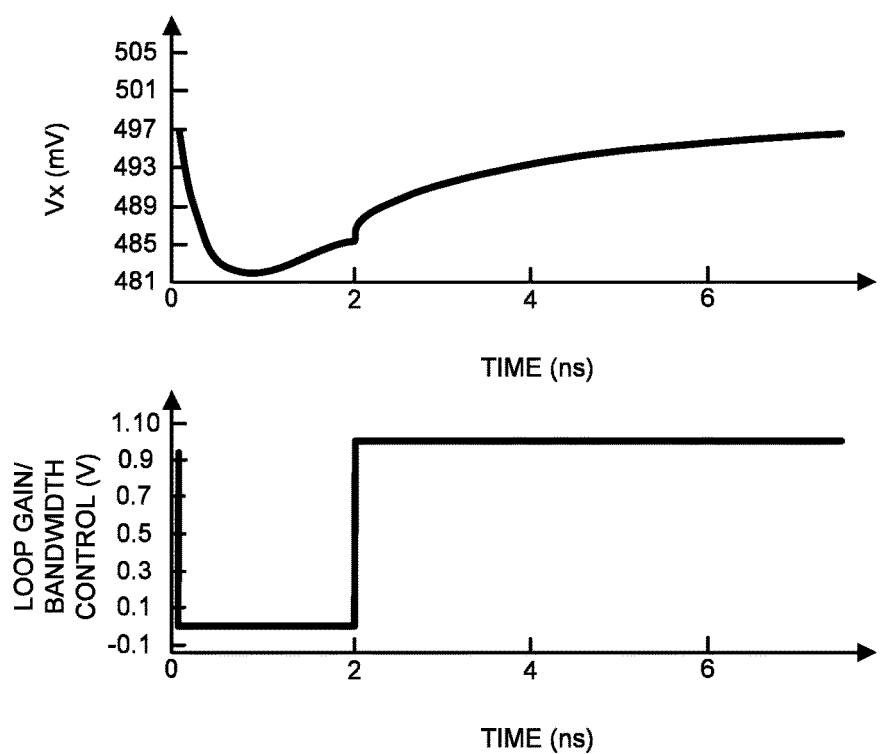
FIG. 9 is a drawing illustrating an example of a simulated DC acquisition of an optical receiver in accordance with an embodiment of the present disclosure.

FIGS. 7-9 illustrate simulations of the performance of the optical burst-mode receiver in 28 nm bulk CMOS. FIG. 7 presents a drawing illustrating an example of a simulated sensitivity 700 of a front-end of the disclosed optical receiver. The total input referred noise is calculated to be 3.8 μA. Moreover, FIG. 8 presents a drawing illustrating an example of a simulated bandwidth 800 of a front-end of an optical receiver. The bandwidth is calculated to be 20 GHz. Furthermore, FIG. 9 presents a drawing illustrating an example of a simulated DC acquisition 900 of an optical receiver. The DC acquisition time is simulated to be less than 6 ns.

In summary, the optical technique may provide a burst-mode optical receiver with low input impedance, high bandwidth and reduced or eliminated DC bias current. Consequently, the optical receiver may have rapid turn on, may have a small communication delay and may facilitate rapid clock recovery and/or resynchronization. Therefore, the optical technique may enable energy proportional communication links, as well as applications in optical switching and reconfigurable optical networks.

Note that the preceding embodiments may include additional or fewer components. Moreover, positions of one or more components may be changed, two or more components may be combined into a single component and/or a component may be divided into two or more components.

Figure 10:
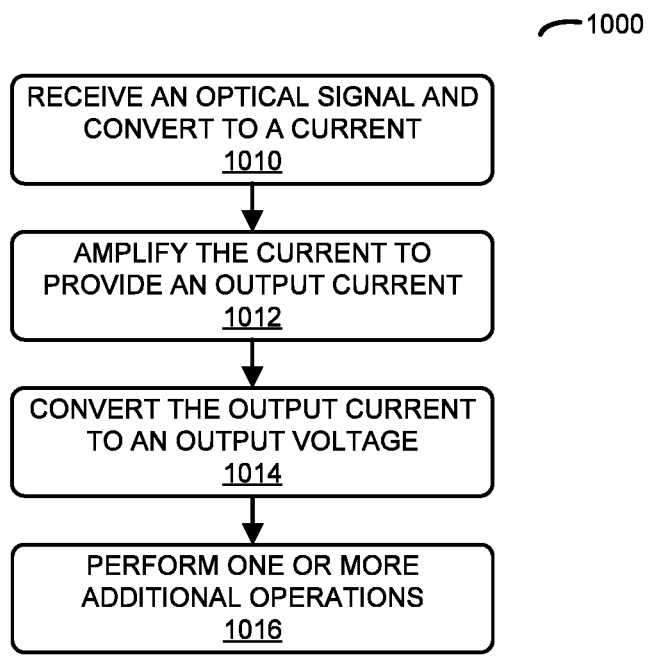
FIG. 10 is a flow chart illustrating a method for converting a current to an output voltage in accordance with an embodiment of the present disclosure.

We now describe embodiments of the method. FIG. 10 presents a flow chart illustrating an example of a method 1000 for converting a current to an output voltage, which may be performed by an optical receiver, such as one of the optical receivers in FIGS. 4-9. During operation, the optical receiver may receive an optical signal representing information and may convert the optical signal to the current (operation 1010) corresponding to the information using an optoelectronic converter. Then, the optical receiver may amplify the current to provide an output current (operation 1012) using a current amplifier, where the current amplifier may have a shunt feedback path that reduces a bias sensitivity of the current amplifier and a feed-forward path that reduces a DC bias current of the current amplifier. Next, the optical receiver may convert the output current to the output voltage (operation 1014) using a TIA, where an output of the TIA is coupled to an input of the feed-forward path by a feedback loop.

In some embodiments, the optical receiver optionally performs one or more additional operations (operation 1016). For example, the optical receiver may acquire the DC bias current of the current amplifier by opening a switch in a feed-forward path in the current amplifier. Moreover, the optical receiver may close the switch in the feed-forward path and may subtract the DC bias current from the output current provided by the current amplifier.

In some embodiments of method 1000, there may be additional or fewer operations. Moreover, the order of the operations may be changed, and/or two or more operations may be combined into a single operation.

Figure 11:
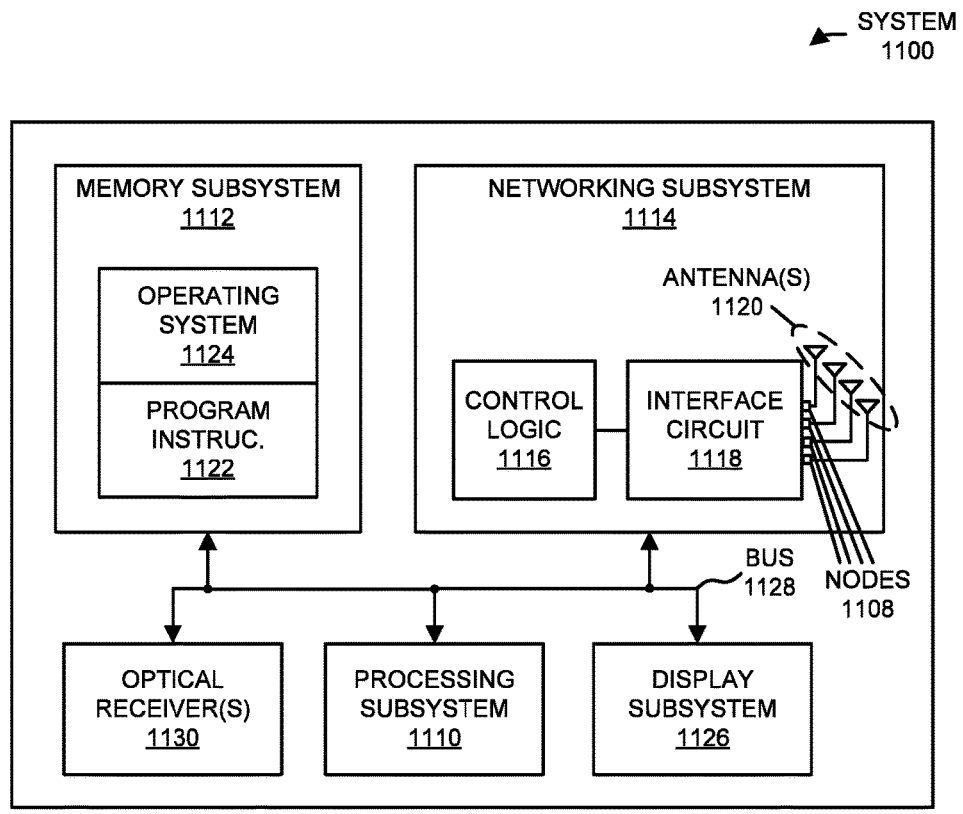
FIG. 11 is a block diagram illustrating a system that includes an optical receiver in accordance with an embodiment of the present disclosure.

We now describe embodiments of a system, which may perform at least some of the operations in the optical technique. FIG. 11 presents a block diagram illustrating an example of a system 1100 (or one or more electronic devices) in accordance with some embodiments. This system includes processing subsystem 1110, memory subsystem 1112, and networking subsystem 1114. Note that one or more of these subsystems may include at least an instance of one of the previous embodiments of the optical receiver in FIGS. 4-9. Alternatively or additionally, system 1100 may optionally include one or more optical receivers 1130 (which may be instances of the optical receiver) in another component, such as a communication link.

Processing subsystem 1110 includes one or more devices configured to perform computational operations. For example, processing subsystem 1110 can include one or more: microprocessors, ASICs, microcontrollers, programmable-logic devices, graphics processing units (GPUs) and/or digital signal processors (DSPs).

Memory subsystem 1112 includes one or more devices for storing data and/or instructions for processing subsystem 1110 and networking subsystem 1114. For example, memory subsystem 1112 can include dynamic random access memory (DRAM), static random access memory (SRAM), and/or other types of memory. In some embodiments, instructions for processing subsystem 1110 in memory subsystem 1112 include: one or more program instructions or sets of instructions (such as program instructions 1122 or operating system 1124), which may be executed by processing subsystem 1110. Note that the one or more computer programs may constitute a computer-program mechanism. Moreover, instructions in the various modules in memory subsystem 1112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1110.

In addition, memory subsystem 1112 can include mechanisms (such as a circuit or software) for controlling access to the memory. In some embodiments, memory subsystem 1112 includes a memory hierarchy that comprises one or more caches coupled to a memory in system 1100. In some of these embodiments, one or more of the caches is located in processing subsystem 1110.

In some embodiments, memory subsystem 1112 is coupled to one or more high-capacity mass-storage devices (not shown). For example, memory subsystem 1112 can be coupled to a magnetic or optical drive, a solid-state drive, or another type of mass-storage device. In these embodiments, memory subsystem 1112 can be used by system 1100 as fast-access storage for often-used data, while the mass-storage device is used to store less frequently used data.

Networking subsystem 1114 includes one or more devices configured to couple to and communicate on a wired and/or wireless network (i.e., to perform network operations), including: control logic 1116, an interface circuit 1118 and one or more optional antennas 1120 (or antenna elements). (While FIG. 11 includes one or more antennas 1120, in some embodiments system 1100 includes one or more nodes, such as nodes 1108, e.g., a pad, which can be coupled to the one or more antennas 1120. Thus, system 1100 may or may not include the one or more antennas 1120.) For example, networking subsystem 1114 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 1114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, system 1100 may use networking subsystem 1114 for performing simple wireless communication, e.g., transmitting advertising or beacon frames and/or scanning for advertising frames transmitted by other electronic devices.

Within system 1100, processing subsystem 1110, memory subsystem 1112, networking subsystem 1114 and optional optical receivers 1130 are coupled together using signal lines, links or bus 1128. These connections may include an electrical, optical, and/or electro-optical connection that the subsystems can use to communicate signals, commands and data among one another.

Furthermore, while some components are shown directly connected to one another in FIG. 11, in general coupling can also occur via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used. Although only one bus 1128 (or one or more signal lines) is shown for clarity in FIG. 11, different embodiments can include a different number or configuration of electrical, optical, and/or electro-optical connections among the subsystems.

In some embodiments, system 1100 includes a display subsystem 1126 for displaying information on a display, which may include a display driver and the display, such as a liquid-crystal display, a multi-touch touchscreen, etc.

System 1100 and/or an instance of the optical receiver may include: an integrated circuit, a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system and/or an instance of the optical receiver may include, but is not limited to: a desktop computer, a server (such as a multi-socket, multi-rack server), a laptop computer, a communication device or system, an access point, a router, a switch, communication equipment, a controller, test equipment, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a smartwatch, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, a sensor (such as a LIDAR sensor), an automobile or a truck, another electronic device, a laser (such as a hybrid laser and/or another optical component.

Although specific components are used to describe system 1100, in alternative embodiments, different components and/or subsystems may be present in system 1100. For example, system 1100 may include one or more additional processing subsystems, memory subsystems, networking subsystems, display subsystems and/or one or more additional subsystems not shown in FIG. 11 (such as a user-input subsystem). Additionally, one or more of the subsystems may not be present in system 1100. Also, although separate subsystems are shown in FIG. 11, in some embodiments some or all of a given subsystem or component can be moved or integrated into one or more of the other subsystems or component(s) in system 1100. For example, in some embodiments program instructions 1122 are included in operating system 1124 and/or control logic 1116 is included in interface circuit 1118. Thus, while system 1100, as well as the previous embodiments of the optical receiver, are illustrated as having a number of discrete items, these components are intended to be functional descriptions of the various features that may be present rather than structural schematics of the embodiments described herein.

Moreover, the circuits and components in system 1100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of system 1100. In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures, such as by one or more: ASICs, FPGAs, DPSs, GPUs, etc. Therefore, some or all of the operations in the preceding embodiments may be performed in hardware, in software or both. For example, at least some of the operations in the optical technique may be implemented using program instructions 1122, operating system 1124 (such as a driver for interface circuit 1118) or in firmware in interface circuit 1118. Alternatively or additionally, at least some of the operations in the optical technique may be implemented in a physical layer, such as hardware in interface circuit 1118. In general, system 1100 may be at one location or may be distributed over multiple, geographically dispersed locations.

Moreover, the preceding embodiments of the optical receiver and/or system 1100 can be used in a wide variety of applications, such as: communications (for example, in a transceiver, an optical source (such as a laser), an optical interconnect or an optical link, such as for intra-chip or inter-chip communication), a radio-frequency filter, a biosensor, data storage (such as an optical-storage device or system), medicine (such as a diagnostic technique or surgery), a barcode scanner, metrology (such as precision measurements of distance), manufacturing (cutting or welding), a lithographic process, data storage (such as an optical-storage device or system) and/or entertainment (a laser light show).

Moreover, while the preceding discussion included some numerical values, these values are for purposes of illustration and are not intended to be limiting. In other embodiments, different numerical values may be used.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An optical receiver, comprising:
   an input node configured to receive a current;
   a current amplifier, coupled to the input node, configured to provide an output current based at least in part on the current, wherein the current amplifier has a shunt feedback path configured to reduce a bias sensitivity of the current amplifier and a feed-forward path configured to reduce a DC bias current of the current amplifier;
   a transimpedance amplifier (TIA), electrically coupled to the current amplifier, configured to convert the output current to an output voltage; and
   a feedback loop coupling an output of the TIA to an input of the feed-forward path.

2. The optical receiver of claim 1, wherein the optical receiver is configured as a burst-mode receiver.

3. The optical receiver of claim 1, wherein the optical receiver comprises an optoelectronic converter configured to receive an optical signal representing information and to provide the current corresponding to the information.

4. The optical receiver of claim 3, wherein the optoelectronic converter comprises a photodiode.

5. The optical receiver of claim 1, wherein the current amplifier is DC coupled to the input node.

6. The optical receiver of claim 1, wherein the current amplifier has an input impedance less than a predefined value.

7. The optical receiver of claim 1, wherein a bandwidth of the shunt feedback path is greater than a predefined value.

8. The optical receiver of claim 1, wherein a DC output current from the current amplifier corresponding to the DC bias current is less than a predefined value.

9. The optical receiver of claim 8, wherein the DC output current is approximately zero.

10. The optical receiver of claim 1, wherein the feed-forward path is configured to acquire the DC bias current and to subtract the DC bias current from the output current.

11. The optical receiver of claim 10, wherein the feed-forward path comprises a switch and the optical receiver comprises control logic;
   wherein, when acquiring the DC bias current, the control logic is configured to set the switch in an open state;
   wherein, when subtracting the DC bias current from the output current, the control logic is configured to set the switch in a closed state; and
   wherein the feedback loop compensates for at least one of mismatch and process variation, and the optical receiver is configured to control a gain of the feedback loop to provide stability.

12. A method for converting a current to an output voltage, comprising:
   by an optical receiver:
      receiving an optical signal representing information and converting the optical signal to the current corresponding to the information using an optoelectronic converter in the optical receiver;
      amplifying the current to provide an output current using a current amplifier in the optical receiver, wherein the current amplifier has a shunt feedback path that reduces a bias sensitivity of the current amplifier and a feed-forward path that reduces a DC bias current of the current amplifier; and converting the output current to the output voltage using a transimpedance amplifier (TIA), wherein an output of the TIA is coupled to an input of the feed-forward path by a feedback loop.

13. The method of claim 12, wherein the method comprises:

acquiring the DC bias current of the current amplifier by opening a switch in the feed-forward path in the current amplifier; and closing the switch in the feed-forward path and subtracting the DC bias current from the output current provided by the current amplifier.

14. A system, comprising:

an optical receiver, wherein the optical receiver comprises:

an input node configured to receive a current;

a current amplifier, coupled to the input node, configured to provide an output current based at least in part on the current, wherein the current amplifier has a shunt feedback path configured to reduce a bias sensitivity of the current amplifier and a feed-forward path configured to reduce a DC bias current of the current amplifier;

a transimpedance amplifier (TIA), electrically coupled to the current amplifier, configured to convert the output current to an output voltage; and a feedback loop coupling an output of the TIA to an input of the feed-forward path.

15. The system of claim 14, wherein the optical receiver is configured as a burst-mode receiver.

16. The system of claim 14, wherein the optical receiver comprises an optoelectronic converter configured to receive an optical signal representing information and to provide the current corresponding to the information.

17. The system of claim 14, wherein a bandwidth of the shunt feedback path is greater than a predefined value.

18. The system of claim 14, wherein a DC output current from the current amplifier corresponding to the DC bias current is less than a predefined value.

19. The system of claim 14, wherein the feed-forward path is configured to acquire the DC bias current and to subtract the DC bias current from the output current.

20. The system of claim 19, wherein the feed-forward path comprises a switch and the optical receiver comprises control logic;

wherein, when acquiring the DC bias current, the control logic is configured to set the switch in an open state;

wherein, when subtracting the DC bias current from the output current, the control logic is configured to set the switch in a closed state; and wherein the feedback loop compensates for at least one of mismatch and process variation, and the optical receiver is configured to control a gain of the feedback loop to provide stability.

* * * * *